United States Patent [19]
Zarowin

[11] 3,764,886
[45] Oct. 9, 1973

[54] THREE-PHASE VOLTAGE TRIPLING RECTIFIER CIRCUIT

[75] Inventor: Charles Bezalel Zarowin, Fairfield, Conn.

[73] Assignee: International Business Machines Corporation, Armonk, N.Y.

[22] Filed: Sept. 28, 1971

[21] Appl. No.: 184,385

[52] U.S. Cl. .................................. 321/15, 321/15
[51] Int. Cl. ........................................ H02m 7/00
[58] Field of Search ........................... 321/5, 10, 15

[56] References Cited
UNITED STATES PATENTS

| | | | |
|---|---|---|---|
| 3,462,671 | 8/1969 | Lawa | 321/47 X |
| 3,259,830 | 7/1966 | Öjelid | 321/15 |
| 3,525,031 | 8/1970 | King | 321/15 |

OTHER PUBLICATIONS

"Analysis of the Voltage-Tripling and Quadrupling Rectifier Circuits," D. L. Waidelich & H. A. K. Taskin, I.R.E. Vol. 33, No. 7, July, 1945, pp. 449–453.
Kepco Power Supply Handbook, Kepco, Inc., Flushing, N.Y., page 8, 1966.

*Primary Examiner*—William M. Shoop, Jr.
*Attorney*—John J. Goodwin et al.

[57] ABSTRACT

A circuit for rectifying and tripling an input voltage from a three-phase source is described. The three-phase input voltage source is connected to the circuit via a wye connected secondary transformer, winding. The center point of the wye connected winding is connected to the midpoint of first and second series connected output capacitors. The other sides of the first and second output capacitors are connected to first and second output terminals respectively. The end of each leg of the three wye connected windings are connected through the second output terminal through a separate reverse biased diode. The end of each leg of the three wye connected windings are also connected through a separate capacitor to the mid-point of separate pairs of two diodes connected in series. One of the diodes of each pair is connected in reverse bias to the mid-point of the output capacitors and the other diode of each pair is connected in forward bias to the first output terminal. Thus, each of the three wye connected windings are connected through circuits including diodes and capacitors and the circuits are connected in parallel across the output terminals to provide a rectified output voltage which is three times the magnitude of the input voltage.

3 Claims, 2 Drawing Figures

INVENTOR
CHARLES B. ZAROWIN

BY *John J. Goodwin*

ATTORNEY

THREE-PHASE VOLTAGE TRIPLING RECTIFIER CIRCUIT

BACKGROUND OF THE INVENTION

1. Field of the Invention

The present invention lies in the field of voltage tripling rectifier circuits.

2. Prior Art

U.S. Pat. No. 3,525,031 to W.L. King, issued Aug. 18, 1970 and assigned to Nathan E. Knecht describes a voltage multiplier and rectifier circuit which is connected to a three-phase A.C. source. The present invention is distinct from this prior art in that the prior art circuit is not symmetrical and merely raises the level of the input voltage wave, does not reduce ripple voltage and therefore does not provide a significant improvement over single phase operation.

SUMMARY OF THE INVENTION

An object of the present invention is to provide a voltage tripling rectifier circuit for use with a three-phase input voltage signal.

Another object of the present invention is to provide a three-phase voltage tripling rectifier circuit having symmetrical circuits connected in parallel.

A further object of the present invention is to provide a three-phase tripling rectifier circuit having to provide an output signal having a ripple voltage significantly less than that for single phase operation.

The foregoing and other objects, features and advantages of the invention will be apparent from the following more particular description of a preferred embodiment of the invention, as illustrated in the accompanying drawings.

BRIEF DESCRIPTION OF THE DRAWINGS

Referring to FIG. 1, a circuit is shown which represents a prior art single phase voltage tripling rectifier circuit. The circuit includes a single phase A.C. source. One side of A.C. source 10 is connected to the midpoint of two series connected output capacitors 12 and 14 across which output terminals 16 and 18 are connected. The other side of A.C. source 10 is connected through back-biased diode 20 to output terminal 18. The other side of A.C. source 10 is also connected through a capacitor 22, the mid-point of two diodes 24 and 26 connected in series. The back side of diode 26 is connected to the mid-point of capacitors 12 and 14 and the forward side of diode 24 is connected to output terminal 16.

Figure 1:
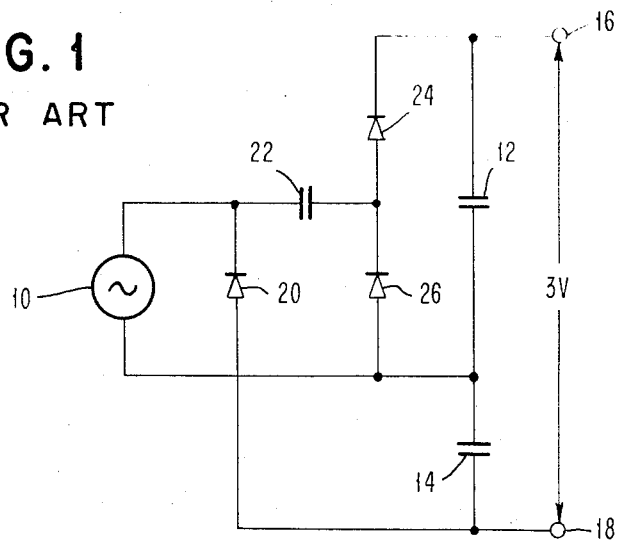
FIG. 1 is a schematic circuit diagram of a prior art single phase voltage tripling rectifier circuit.

In operation, the positive half cycle of voltage is produced from source 10 and cannot pass through diode 20. The positive half cycle of voltage charges capacitor 22 and a negative voltage appears at the junction of diodes 24 and 26. The negative voltage at the junction of diodes 24 and 26 causes a current flow through diode 26 to the junction of capacitors 12 and 14. The voltage V is distributed at the capacitors 12 and 14 in accordance with their respective values. For example, if the value of capacitor 12 is equal to the value of capacitor 14, both capacitors are charged to V/2. When capacitors 12 and 14 are charged, the output voltage across terminals 16 and 18 is equal to V.

When the negative half cycle of input voltage occurs, current flows through diode 20 to charge capacitor 14. Capacitor 22 also gets charged in the opposite direction and capacitor 22 stays charged due to diode 24. Thus, capacitors 12 and 14 contain a total charge of 2V and the potential across output terminals 16 and 18 is 2V.

Upon the occurrence of the next positive half cycle of input voltage capacitor 12, charges to a value of 2V and the charge on capacitor 14 remains the same (V) so that the voltage across the output terminals 16 and 18 is 3V. For all further cycles, the output voltage across output terminals 16 and 18 is 3V. Thus, after an initial build up period of three cycles, the output across terminals 16 and 18 is a rectified voltage three times the value of the input voltage.

An important factor in the performance of a rectifier circuit is the amount of ripple present in the output voltage. Ripple is undesirable and should be minimized or eliminated if possible. Ripple is an inverse function of the product of frequency, resistance and capacitance ($\omega RC$) of the rectifier circuit. If the circuit operates at a frequency of 60 Hertz, the load resistance R decreases in order to increase the power output. Thus, the capacitance C must be increased in order to limit the ripple amplitude. Since there are practical constraints on the physical size of the capacitors that can be used, reduction of the amount of ripple in the single phase prior art circuit shown in FIG. 1, can only be accomplished by increasing frequency and/or load resistance.

Figure 2:
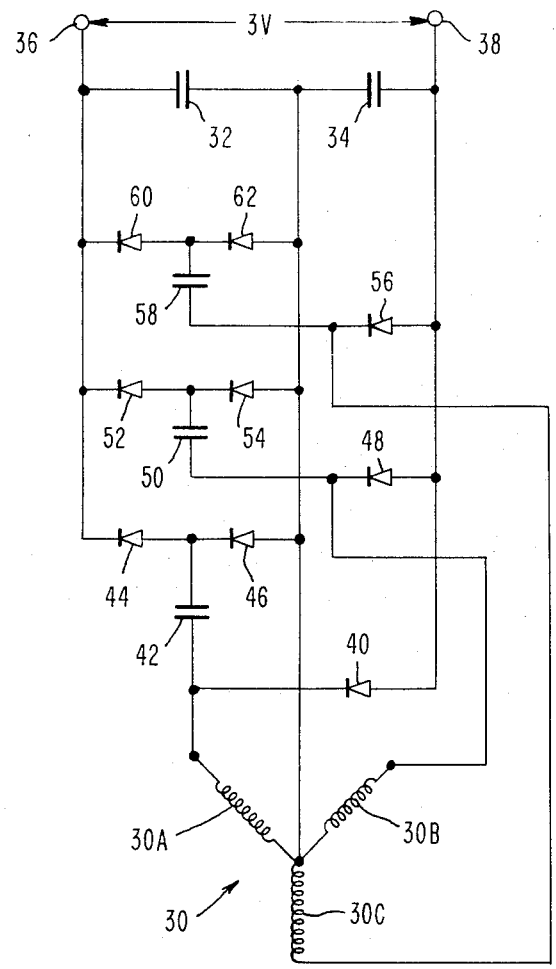
FIG. 2 is a schematic circuit diagram of a three-phase voltage tripling rectifier circuit according to the principles of the present invention.

Referring to FIG. 2, a unique voltage tripling rectifier circuit operating from a three-phase input voltage is illustrated. The three-phase voltage source in the embodiment is a wye connected three-phase transformer secondary winding 30 having three legs 30A, 30B and 30C. The center of secondary winding 30 is connected to the junction of two output capacitors 32 and 34 which are connected across output terminals 36 and 38. The ends of each of the legs 30A, 30B and 30C are respectively connected to three identical circuits each composed of three diodes and a capacitor.

The end of leg 30A is connected through a back biased diode 40 to output terminal 38 and through capacitor 42 to the junction of a pair of diodes 44 and 46. The back of diode 46 is connected to the junction of output capacitors 32 and 34 and the front of diode 44 is connected to output terminal 36. Likewise, the end of leg 30B is connected through back biased diode 48 to output terminal 38 and through capacitor 50 to the junction of diodes 52 and 54. The back of diode 54 is connected to the junction of output capacitors 32 and 34 and the front of diode 52 is connected to output terminal 36. In the same manner, the end of leg 30C is connected through back biased diode 56 to output terminal 30 and through capacitor 58 to the junction of diodes 60 and 62. The back of diode 62 is connected to the junction of output capacitors 32 and 34 and the front of diode 60 is connected to output terminal 36.

From the aforesaid description, it is seen that each of the legs of winding 30 are symmetrically connected through a rectifier circuit composed of three diodes and a capacitor. The three rectifier circuits are connected in parallel across output terminals 36 and 38. If each of the capacitors 42, 50 and 58 have a value of C, then capacitors 32 and 34 have values three times as large (3C).

A three-phase AC signal is produced at winding 30. A sinusoidal AC signal appears across each leg 30A, 30B and 30C with a phase difference of 120 degrees. The positive half cycle of the signal on leg 30A is blocked but diode 40 charges capacitor 42. A negative voltage therefore appears at the junction of diodes 44 and 46 causing capacitors 32 and 34 each to be charged to a value V/2 and a voltage V is present across the output terminals 36 and 38. The negative half cycle of the signal on leg 30B causes current to flow through diode 40 and capacitor 34 becomes further charged. Capacitor 42 gets charged in the opposite direction and capacitor 32 remains charged due to diode 44.

If only the signal on leg 30A were present, the output voltage across terminals 36 and 38 would be 2V, however, during the occurrence at the negative half cycle of the signal on leg 30A, a positive half cycle begins on leg 30B which is 120 degrees of phase with the signal on leg 30A. The operation of the signal on leg 30B is the same as described for leg 30A except that diodes 52, 54 and 48 and capacitor 50 and involved. A sinusoidal signal on leg 30C occurs 120 degrees after the signal on leg 30B and operates in a similar manner to the signals on legs 30A and 30B except that diodes 60, 62 and 56 and capacitor 58 are employed. The three symmetrical circuits forming the three phase rectifier are connected in parallel across the output terminals 36 and 38 with the result that the signals from each circuit add together and the resultant output signal across terminals 36 and 38 is 3V where V is the amplitude of the three phase signal from winding 30.

A distinct advantage of the circuit of FIG. 2 is the reduced ripple voltage. Ripple is an inverse function of the frequency, resistance and capacitance ($\omega RC$) of the rectifier circuit. Thus, the larger the resistance, capacitance and frequency the smaller the resultant ripple. Most rectifier circuits operate at 60 cycles. Therefore, the frequency is fixed and for power applications, a small resistance is desired in order that a large current can be produced. Thus, to reduce ripple in a single phase rectifier as shown in FIG. 1, a prohibitively large capacitance must be provided. In the circuit of FIG. 2, however, each of the symmetrical circuits contributes a signal three times more frequently into the parallel output capacitors 32 and 34, that is, three times more signal is provided for every half cycle of each phase in the three-phase circuit of FIG. 2. This means that the effective frequency is three times that of the single phase circuit and the parallel connection produces three times the capacitance. More particularly, in FIG. 2, the two capacitors 32 and 34 provide the equivalent of three of the capacitors 12 and three of the capacitors 14 of the circuit shown in FIG. 1. Thus, the two capacitors in FIG. 2 function more effectively than if the three pairs of capacitors of FIG. 1 were connected in parallel. Since the frequency ($\omega$) is three times greater and the capacitance (C) is three times greater, ($\omega RC$) is nine times larger than in the single phase circuit and thus, the ripple parameter is greater by a factor of nine rather than three, reducing the ripple appreciably.

What has been described in a three-phase voltage tripling rectifier circuit including a unique combination of capacitors and diodes which form three symmetrical circuits. An advantage of the three-phase rectifier circuit is that it operates with a substantially low ripple voltage.

While the invention has been particularly shown and described with reference to a preferred embodiment thereof, it will be understood by those skilled in the art that the foregoing and other changes in form and details may be made therein without departing from the spirit and scope of the inventionl

What is claimed is:

1. A three-phase voltage tripling rectifier circuit comprising:
   a three-phase winding including three legs for producing a three-phase AC voltage;
   three identical circuits composed of diodes and capacitors including two output capacitors, each one of said circuits connected to a separate one of said legs of said winding;
   and a pair of series connected output capacitors connected to said three identical circuits for producing a rectified output voltage three times the amplitude of said three-phase AC voltage wherein said three identical circuits whose outputs are connected in parallel and said series connected output capacitors are equivalent to capacitors of said three identical circuits connected in parallel.

2. A three-phase voltage tripling rectifier circuit according to claim 1 wherein each of said three identical circuits includes a back biased diode between the associated one of said legs of said winding and one side of said pair of series connected output capacitors;
   a pair of series connected diodes connected to the other side of said pair of series connected output capacitors; and a capacitor connected between said back biased diode and the junction between said pair of said series connected diodes.

3. A three-phase voltage tripling rectifier according to claim 2 wherein said legs of said three-phase winding are connected to a wye arrangement at a common junction and wherein said common junction of said three-phase winding is connected to each of said pair of series connected diodes of said identical circuits and to the junction of said pair of series connected output capacitors.

* * * * *